(12) United States Patent
Hesse

(10) Patent No.: US 9,411,714 B2
(45) Date of Patent: Aug. 9, 2016

(54) FINITE STATE MACHINE FOR SYSTEM MANAGEMENT

(71) Applicant: Intel Deutschland GmbH, Neubiberg (DE)

(72) Inventor: Kay Hesse, Dresden (DE)

(73) Assignee: Intel Deutschland GmbH, Neubiberg (DE)

( * ) Notice: Subject to any disclaimer, the term of this patent is extended or adjusted under 35 U.S.C. 154(b) by 161 days.

(21) Appl. No.: 13/763,614

(22) Filed: Feb. 8, 2013

(65) Prior Publication Data

US 2013/0205104 A1 Aug. 8, 2013

(30) Foreign Application Priority Data

Feb. 8, 2012 (EP) ..................................... 12154410

(51) Int. Cl.
*G06F 12/00* (2006.01)
*G05B 19/045* (2006.01)
*G06F 9/44* (2006.01)

(52) U.S. Cl.
CPC .............. *G06F 12/00* (2013.01); *G05B 19/045* (2013.01); *G05B 2219/23289* (2013.01); *G06F 9/444* (2013.01)

(58) Field of Classification Search
None
See application file for complete search history.

(56) References Cited

U.S. PATENT DOCUMENTS

| 5,765,026 A * | 6/1998 | Lin et al. ........................ 710/30 |
| 7,061,272 B2 * | 6/2006 | Wilkes et al. .................. 326/46 |
| 7,683,665 B1 * | 3/2010 | Fritz et al. ...................... 326/38 |
| 2004/0054848 A1 * | 3/2004 | Folsom ........................ 711/108 |
| 2006/0015709 A1 * | 1/2006 | Bragagnini et al. .......... 712/245 |
| 2006/0062036 A1 * | 3/2006 | Ng ......................... G11C 15/00 365/49.17 |
| 2007/0157042 A1 | 7/2007 | Jahagirdar et al. |

FOREIGN PATENT DOCUMENTS

| GB | 2403821 A | 1/2005 |
| GB | 2461648 A | 1/2010 |

OTHER PUBLICATIONS

Pagiamtzis, Kostas and Sheikholeslami, Ali. "Content-Addressable Memory (CAM) Circuits and Architectures: A Tutorial and Survey". IEEE Journal of Solid-State Circuits. vol. 41. No. 3. Published Mar. 2006.*
"A Memory-Efficient Reconfigurable Aho-Corasick FSM Implementation for Intrusion Detection Systems", Dimopoulos et al., Embedded Computer Systems Conference, Jul. 16-19, 2007.
"Efficient Logic Controller Design", Borowik et al., Broadband and Biomedical Communications Conference, Dec. 15-17, 2010.

* cited by examiner

*Primary Examiner* — Charles Rones
*Assistant Examiner* — Hewy Li
(74) *Attorney, Agent, or Firm* — Schwegman Lundberg & Woessner, P.A.

(57) ABSTRACT

Implementations relate to a hybrid finite state machine that is based on a micro-coded processor and the use of look-up tables to implement combinational logic. Micro-coding is used to describe the state transitions of the FSM and look-up tables are used to determine the conditions for state transitions and to generate the outputs as a function of the state.

11 Claims, 5 Drawing Sheets

FINITE STATE MACHINE FOR SYSTEM MANAGEMENT

RELATED APPLICATION

This Application claims priority to European Patent Application 12154410.0, filed on Feb. 8, 2012. The entire contents of the European Patent Application are incorporated herein by reference.

TECHNICAL FIELD

At least one implementation relates to a hybrid finite state machine (FSM) for system management. One particular implementation relates to a hybrid FSM for system management on a computer chip.

BACKGROUND ART

Complex Systems-on-a-Chip (SOCs) contain a variety of different functional modules on a single die of silicon, comprising billions of transistors. These SOCs usually contain one or more embedded processors, on-chip memories, hardware accelerators for e.g. cryptography and peripheral controllers for human interfacing like keyboard, screen, etc. All these units are interconnected via a hierarchy of buses, using different frequencies and potentially even different protocols, with dedicated bus bridges connecting these bus segments.

Overarching is a system management controller, usually connected to the main application processor that is responsible for proper power and clock supply for the SOCs, interacting with potentially off-chip voltage regulators, PLLs and clock dividers and clock gates.

FIG. 1 shows an embodiment of a state of the art SOC 11 with system management 12 connected to peripheral bus 15, clock supply 13 and voltage supply 14 connected to a plurality of modules; keyboard 114, touchpad 115, audio 116, LCD 117 and camera 118 connected to peripheral bus 15; peripheral bus 15 connected to processor bus 16 via bus bridge 119; application processor 18, RAM 19, crypto 110 and Ethernet 111 connected to processor bus 16; processor bus 16 connected to memory bus 17 via bus bridge 120; and ROM 112 and Flash 113 connected to memory bus 17.

System management for these chips also became increasingly complex, and the times of a simple On/Off/Standby are long gone. Especially for mobile devices aggressive power management is employed to extend battery life, but also systems with wall-plugged supply try to control power consumption to minimize thermal design power, thus allowing for slower fan speeds and/or more compact cases for a better user experience. Further, modern SOCs need several different clocks and voltages, which usually also require a certain sequencing. So, modern system management has a variety of tasks to handle:
control system ramp-up, i.e. switch on voltages and clocks in a specific sequence
bring system into and out of stand-by, i.e. switch off most parts of the system
again, ensure proper sequencing
parts of the system might stay in retention, i.e. prevent data loss in sleep state
stand-by also implies that the system management stays powered when the rest of the SOC is switched off (always-on domain)
react on wake-up events
fine-tune power consumption during normal operation, this comprises:
slow down or switch off clocks for system parts not currently needed
increase clock speed temporarily when processing power is needed
dynamically increase/decrease voltage in accordance with clock speed On an abstract level, system management is a finite state machine (FSM) that stores a state vector, which may contain the system state, e.g. sleep, slow processing, high-speed processing, etc.; and reacts on inputs such as power and clock requests, wake-up events, etc.; and generates outputs such as voltage controls, clock enables, etc.

On a physical level, there are essentially two approaches to implement this FSM:
a) hard-wired as shown in FIG. 2. The state vector 25 is an array of flip-flops and combinational logic 22 processes the inputs 21 to calculate the next state 24 and generate the outputs 27 by means of output logic 26, based on current state 23.
b) as a program in an embedded processor as shown in FIG. 3: the state vector 35 is simply a place in the processor's memory 36 and software code 32 processes the input conditions to calculate next state and output vector. The processor 31 may be a dedicated small embedded processor in the system management unit or the task is handled by the main application processor along with its other tasks.

Both these approaches have their advantages and drawbacks:
The hard-wired FSM is small and easy to contain an always-on power domain. However, it is also fixed in functionality, in meaning of its states and their transitions. This can become problematic when adjustments become necessary, as this then requires silicon spins.

The software on an embedded processor is relatively easy to adjust, adding or deleting states or transitions only requires a new program. However, an embedded processor requires a relatively large silicon area, more power and also usually a higher clock during stand-by than the hard-wired FSM would need.

SUMMARY

A finite state machine and respective system are provided and have an improved efficiency. In one implementation, a finite state machine and respective system are provided having an improved flexibility and smaller silicon footprint.

One implementation relates to a programmable finite state machine configured to transition from a current state to a next state after receiving an input symbol, the input symbol comprising a plurality of inputs, each of the next states and current states being represented by N bits and each input symbol being represented by I bits, the finite state machine being further configured to generate an output symbol comprising a plurality of outputs, the output symbol being represented by W bits, the output symbol being dependent on the current state, wherein the FSM is a hybrid FSM.

The hybrid FSM is based on a micro-coded processor and the use of look-up tables to implement combinational logic. Micro-coding is used to describe the state transitions of the FSM and look-up tables are used to determine the conditions for state transitions and to generate the outputs as a function of the state.

Therefore, the FSM comprises a microcode table with a plurality of entries, each entry representing a state transition. This determines how the FSM reacts on input events like wake-up, timer expired, user input, processing speed requirements, etc. depending on the current state. The microcode table is basically a table of length L which is the total number of possible state transitions.

The hybrid FSM further comprises a register configured to store the current state and a first look-up table configured to store a plurality of output symbols with the current state being the address of the first lookup table. The construction as a look-up table allows for the output logic to be programmable, if implemented as RAM or flip-flop array. The look-up table may be of length 2N and width W. The output signals may comprise voltage controls, clock enables and clock speeds.

One described aspect relates to the configuration of the microcode table. The microcode table may be configured to select all entries for transitioning according to the current state.

Each microcode table entry may comprise a state information field and a transition condition field. The layout of these fields is determined as a compromise between flexibility and necessary memory size.

The state information field may be configured to store a state to which the finite state machine is to be transitioned in a to-state-field.

The transition condition field may be configured to store a Boolean function for transition from the current state to the next state by processing the input symbol.

One described aspect relates to microcode table configuration with a fixed number of possible transitions per state. The state information field contains only N bits which is the same width as the state vector as it only needs to describe the state to which state the FSM is to be transitioned. Further, fixed sections of the microcode table are assigned to each state and the current state then just selects the microcode section that needs to be considered for processing.

One described aspect relates to a microcode table configuration with a fixed total number of transitions that is equal to the number length L of microcode table with a flexible number of transitions per state. The state information field needs to be twice as wide, i.e. 2*N, because it needs to store the state for which the entry is meant (the current state, from which the FSM is to be transitioned) and the state to which the transition shall lead. This also implies that the microcode table needs to be a CAM (contents addressed memory), selecting all entries for processing where the from-state-field matches the current state. Hence, this configuration requires more bits per entry, but also provides for a much more flexible FSM.

One described aspect relates to the transition condition field. In the most general form, the transistion condition field would need $2^I$ bits for I input signals. The inputs address the $2^I$ bits which contain the function value for each combination of inputs which is again a look-up table.

One described aspect relates to the transition condition field which may be configured to store a restricted number of inputs that may contribute to a given transition condition. This is possible because usually the changes in system state are gradual and somewhat grouped. For example, there is usually a transition from a sleep state to a power-on state based on a wake-up signal, but once in power-on, the system doesn't need to look at the wakeup signal, but reacts on other signals e.g. for different clock speeds to fine-tune processing speed and power consumption. Therefore, the condition field may be divided into two parts, one signal select field with S select bits and one function field with V value bits. Although the signal selection requires a number of bits, the sum field width S+V for a given total number of input signals can still be smaller than for the function (of all inputs) alone. Thus, the size of the FSM microcode is reduced and in result the silicon footprint as well.

One described aspect relates the implementation of single microcode table and output lookup table entries as ROM (or combinational logic), providing an FSM "skeleton" and further minimizing the silicon footprint.

In case there is a transition that is the same for two different acts of programming the microcode tables (i.e. describes the transition from one state to a second state under the same conditions), their respective microcode table entries can be replaced by fixed values. Often, this is the case in real systems, as e.g. there is always a transition from a sleep state to an awake state triggered by a wake-up signal. This allows to implement a fix "skeleton" of states and transitions. The same is true for the output signal lookup table. With the remaining programmable microcode and output look-up table entries there is still enough flexibility left.

One described aspect relates to dynamic reprogramming to describe substantially different sets of FSM states like sleep vs. processing mode, which allows to work with a smaller FSM than would be necessary to implement the full system state graph otherwise.

The dynamic reprogramming of the presented microcode FSM allows a further optimization. When designing the overall state diagram of a system, including all sleep states (e.g. light and deep sleep with individually powered down sections and different wake-up times) and all processing states (with e.g. different clock speeds and supply voltages) this might become quite large thus requiring an FSM with a wide state vector in order to encode all states and a long microcode table in order to store all transitions with their respective conditions. However, there is mostly a quite disjunct set of states and transitions for the sleep and processing modes. So, it is possible to have the SOC's application processor reprogram the FSM shortly before entry into sleep and shortly after wake-up. Shortly before entering sleep state, the processor would program the FSM with the states and transitions that allow entry into sleep and handle of the wake-up sequence (e.g. powering up voltages and clocks). After the system came out of sleep, the processor would reprogram the FSM to now handle fine-granular dynamic voltage frequency scaling required during normal processing, preferably based on calculation speed requirements. This approach allows to minimize both the number of states and transitions that the FSM needs to handle autonomously.

One described aspect relates to a system-on-a-chip comprising the finite state machine. The finite state machine is configured to provide a system management functionality. The system management functionality is configured to manage a plurality of components on a chip.

One described aspect relates to the system-on-a-chip wherein the state of the finite state machine may comprise sleep and/or high speed processing and/or slow speed processing; and/or wherein the inputs of the finite state machine comprise power requests and/or clock requests; and/or wherein the output of the finite state machine comprises voltage controls and/or clock.

One described aspect relates to a method for providing and executing a contents addressed memory microcode, the microcode representing a finite state machine functionality with state transitions from a current state to a next state and output according to a change of an input, wherein each microcode entry of the microcode contains a field for storing a from-state, a field for storing a to-state, a field for storing a select symbol and a field for storing a function symbol. The method involves: a) comparing the current state to the from-state field of all microcode entries concurrently, b) selecting at least one input out of the input symbol according to the select symbol, c) using said at least one selected input to form the index into the lookup table to derive the function value, and in case the function value is zero, the FSM stays in the current state, and in case the function value is one said specific microcode entry is outputted, wherein the output symbol is generated by means of a lookup table, with said to-state being the address of said lookup table.

One particular structure of a system management includes a FSM based on microcode and look-up tables.

This structure for a system management FSM combines the advantages of a hardwired FSM such as small silicon footprint and low power consumption with those of software running on an embedded processor such as flexibility, easy to bring in post tape-out changes without the need for a silicon spin.

BRIEF DESCRIPTION OF THE DRAWINGS

The method and related system according to various implementations are described in more detail herein below by way of exemplary embodiments and with reference to the attached drawings. The attached drawings include the following.

DETAILED DESCRIPTION

Figure 1:
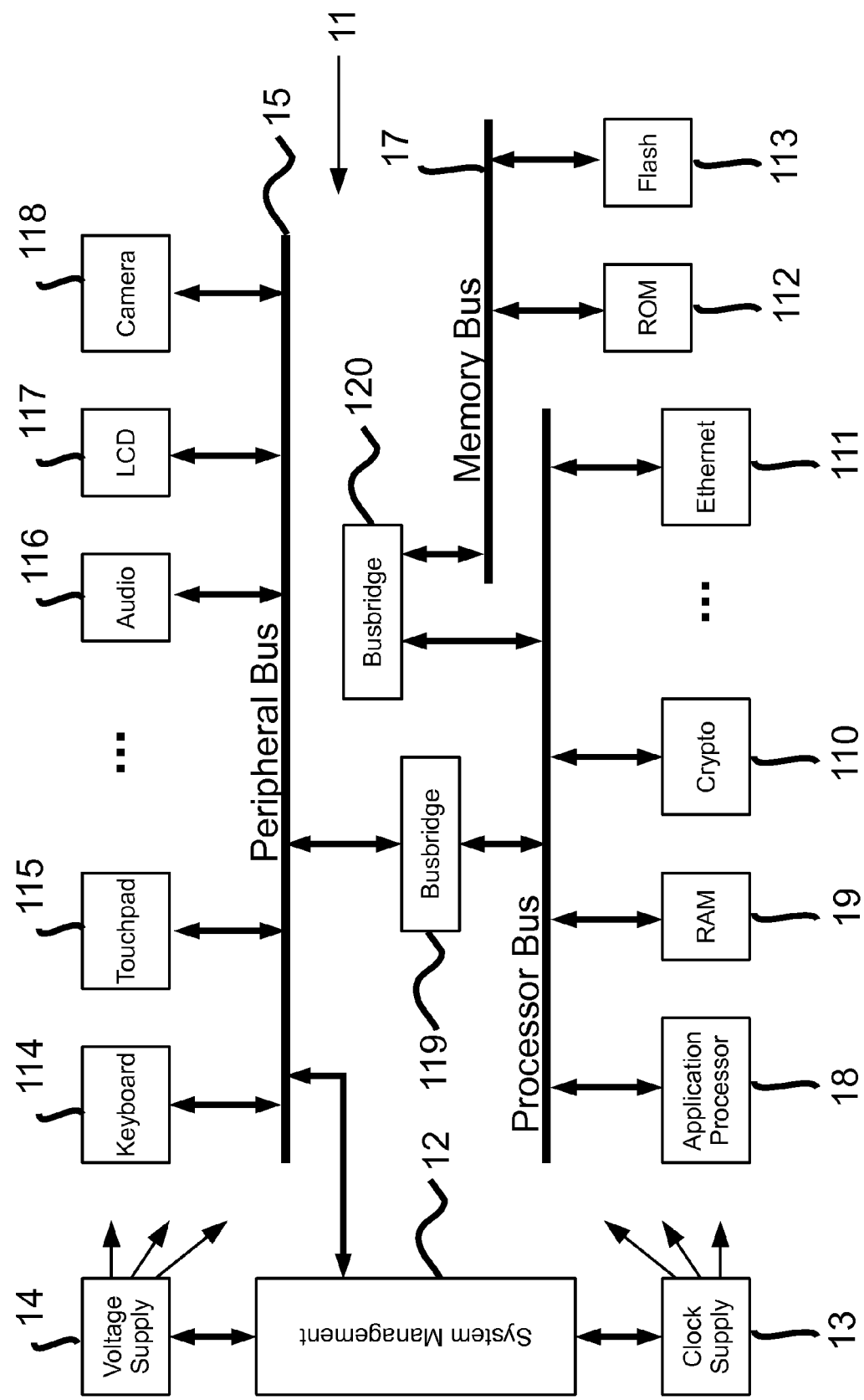
FIG. 1 shows a state-of-the-art complex System on Chip.
Figure 2:
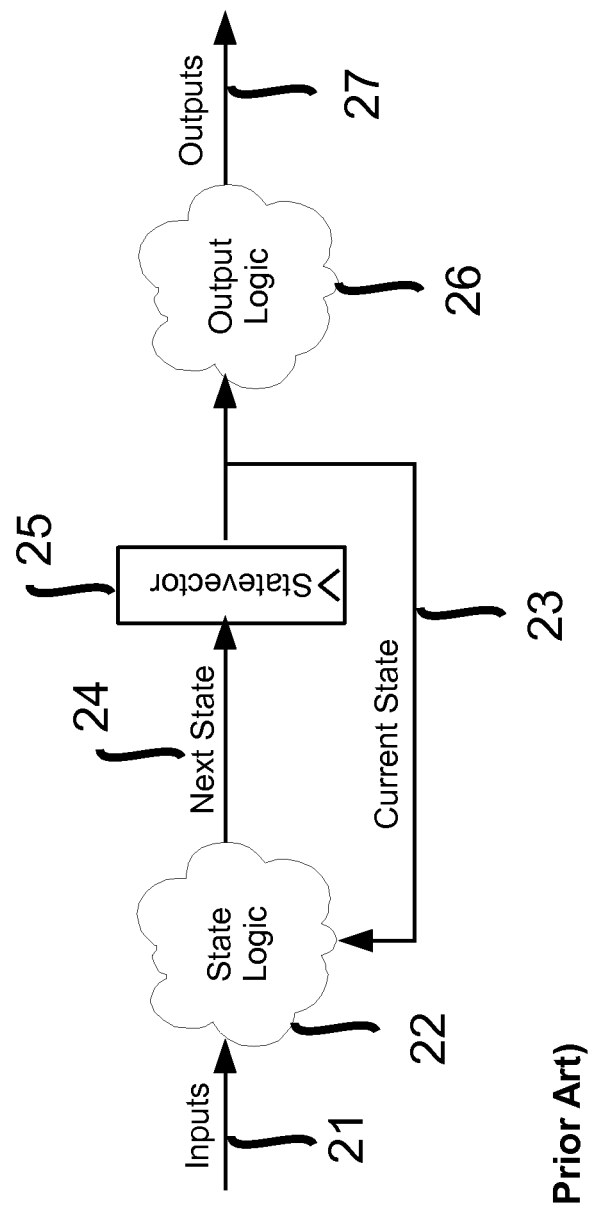
FIG. 2 shows a state-of-the-art hard-wired FSM implementation.
Figure 3:
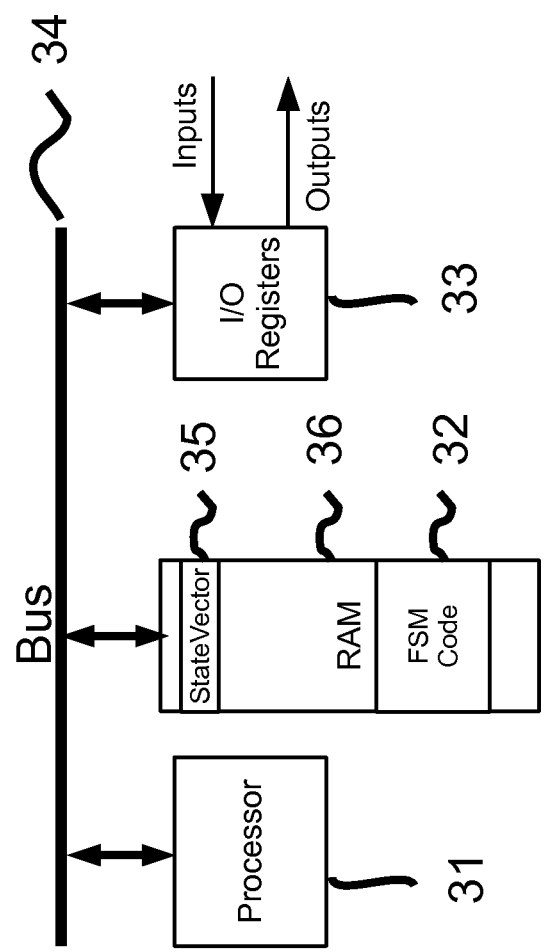
FIG. 3 shows a state-of-the-art software FSM implementation.
Figure 4:
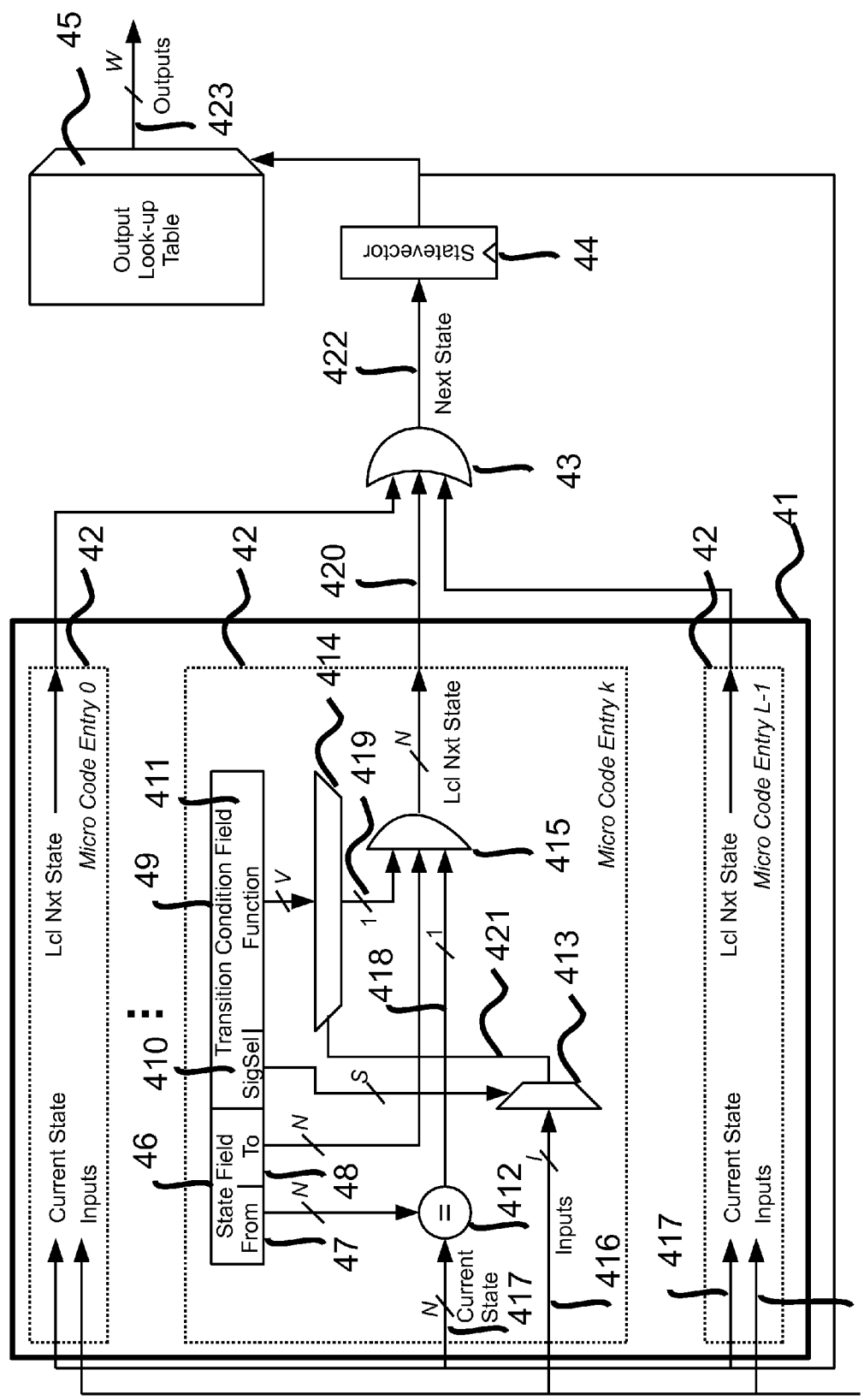
FIG. 4 shows a microcode FSM implementation.

FIG. 4 shows the principle structure of an FSM based on a microcode implementation. In one implementation, the microcode and associated described elements are embodied at least partially in hardware. In another implementation, the microcode and associated described elements are embodied at least partially in hardware and at least partially in instructions that may be executed by a processor and stored in tangible medium. The microcode and associated elements may be implemented in a read-only memory (ROM), static random access memory (SRAM), or the like. Each microcode entry 42 of the microcode table 41 comprises a state field 46 and a transition condition field 49. The microcode table 41 is based on CAM functionality. The state-field 46 comprises a from-state-field 47 and a to-state-field 48. The transition condition field 49 is partitioned in a signal selection field 410 and a transition function field 411. The FSM comprises a register for storing the state vector 44 and an output table 45 that is connected to the state vector register 44. The current state 417 is stored in the state vector register 44. Current state 417 and inputs 416, also referred to as input symbols, are read by the FSM microcode. The from-state stored in the from-state-field 47 is compared with the current state 417 by the comparison unit 412 and in case equality is determined a logical true is generated for the logical state decision signal 418. The multiplexer 413 selects S inputs 421 out of I inputs 416. The selected inputs 421 form the index into the transition condition function table stored in the transition function field 411 by the transition unit 414 and generate the logical transition decision signal 419. The logical state decision signal 418, the logical transition decision signal 419 and the to-state 420 stored in the to-state-field 48 are inputted into a logical and-gate 415 that outputs the to-state 420 in case both logical decisions signals are true and outputs zero in case either one of the logical decision signals is false. This is done for every microcode entry. The output 423 of each micro code entry 42 is inputted in an OR gate 43. Since all but one inputs of said OR gate 43 are zero only the to-state 420 for which the transition has taken place is outputted as next state 422 and stored in the state vector register 44. The output 423 is then generated by means of the output look-up table 45.

In one embodiment of a microcode table configuration with a fixed number of possible transitions per state the microcode length is 64 entries and the state vector is 4 bits wide, i.e. 16 possible states. Each state is assigned 4 entries that describe transitions from this state to some other state.

In one embodiment of a microcode table configuration with a fixed total number of transitions that is equal to the length of microcode table with a flexible number of transitions per state the microcode length is 64 entries and the number of states is 16. Each of the 16 states can have a different number of assigned entries, only their sum is limited to 64.

Figure 5:
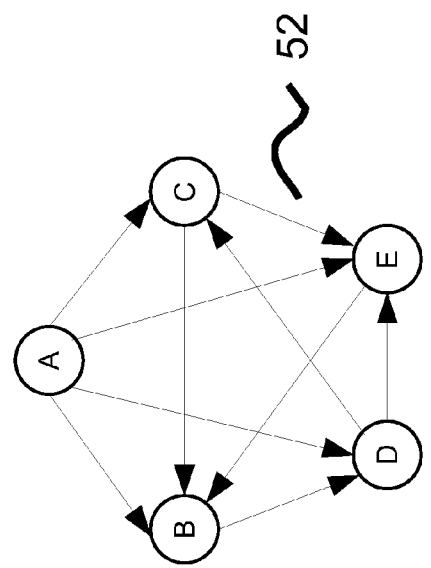
FIG. 5 shows embodiments of expressible state diagrams.
Figure 5:
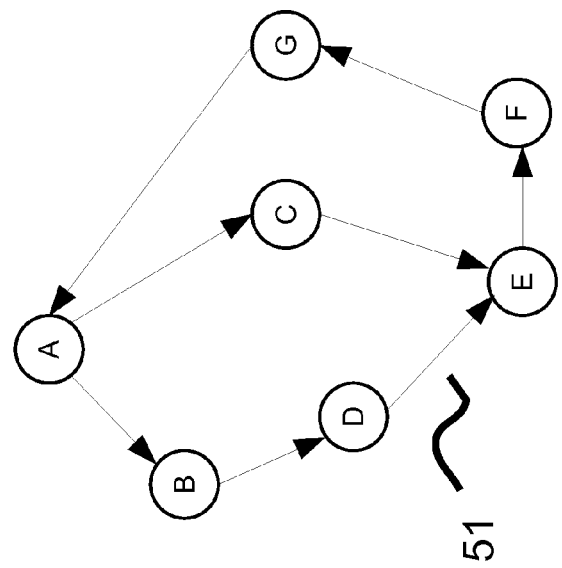

In one embodiment individual entries of the microcode table are implemented as ROM and not as RAM or flip-flops. This will minimize silicon footprint and power consumption. A fixed state diagram skeleton is implemented for a first case 51 and a second case 52 as shown in FIG. 5: As can be seen, in both cases there is a transition from state A to state B and another to state C. If these transitions happen under the same conditions, then their respective microcode table entries are replaced by fixed values.

While implementations have been illustrated and described in detail in the drawings and foregoing description, such illustration and description are to be considered illustrative or exemplary and not restrictive. It will be understood that changes and modifications may be made by those of ordinary skill within the scope and spirit of the following claims.

What is claimed is:

1. A programmable finite state machine configured to transition from a current state to a next state after receiving an input symbol, the input symbol comprising a plurality of inputs, the next state and the current state being represented by N bits and the input symbol being represented by I bits, the finite state machine being further configured to generate an output symbol comprising a plurality of outputs, the output symbol being represented by W bits, the output symbol being dependent on the current state, the finite state machine comprising:

a register configured to store the current state;

a first look-up table configured to store a plurality of output symbols indexed by address and to provide at an output a first output symbol addressed by the value of the register; and a microcode table with a plurality of entries, wherein each entry of the plurality of entries represents a state transition of a number of state transitions of the programmable finite state machine and includes microcode logic for evaluating the state transition simultaneously with other state transitions of other entries of the plurality of entries, wherein the microcode logic includes:

a plurality of programmable fields;

a comparator for comparing the current state to a first programmable field of the plurality of programmable fields;

a multiplexer circuit for evaluating a portion of the input symbol against second and third programmable fields of the plurality of programmable fields; and an AND-gate circuit configured to receive an output of the comparator and an output of the multiplexer circuit and, if evaluated as true, to pass a value of a fourth programmable field of the plurality of programmable fields to the register.

2. The programmable finite state machine according to claim 1, wherein the microcode table is configured to concurrently compare all entries for transitioning according to the current state and wherein the second and third programmable fields are configured to store a transition Boolean function for transitioning from the current state to the next state by processing the input symbol.

3. The programmable finite state machine according to claim 1, wherein fixed sections of the microcode table are assigned to each of the states from which the finite state machine is to be transitioned and wherein the current state selects the microcode section to be considered for processing.

4. The programmable finite state machine according to claim wherein the microcode is content addressable memory, and
wherein the first programmable field is a state information field, the state information field being further configured to store a state from which the finite state machine is to be transitioned in a from-state-field, and the microcode table being further configured to select all entries for processing where the from-state-field matches the current state.

5. The programmable finite state machine according to claim 2, wherein the transition condition field is divided into a select field configured to store a select symbol represented by S bits and a function field configured to store a function symbol represented by V bits, the microcode table is configured to select a number of inputs out of the input symbol as a function of the select symbol, and the microcode table is further configured to process a transition Boolean function represented by the function symbol on the selected inputs.

6. The programmable finite state machine according to claim 5, wherein the transition Boolean function is implemented as a second lookup table with the selected inputs being the address of the second lookup table.

7. The programmable finite state machine according to claim 1, wherein individual entries of the microcode table are implemented as ROM and/or combinational logic.

8. The programmable finite state machine according to claim 1, wherein a set of states and transitions is divided into a plurality of disjunct subsets, each subset being assigned to a specific mode; and wherein the finite state machine is reprogrammed to the disjunct subset according to the specific mode.

9. The programmable finite state machine according to claim 8, wherein one mode and corresponding subset relates to a sleep mode of a system and/or wherein one mode and corresponding subset relates to a normal processing mode of system.

10. A system-on-a-chip comprising a programmable finite state machine according to claim 1, wherein the finite state machine is configured to provide a system management functionality, the system management functionality being configured to manage a plurality of components on a chip.

11. The system according to claim 10, wherein the state of the finite state machine comprises sleep and/or high speed processing and/or slow speed processing; and/or wherein the inputs of the finite state machine comprise power requests and/or clock requests; and/or wherein the output of the finite state machine comprises voltage controls and/or clock.

* * * * *